(12) United States Patent
Comlekoglu

(10) Patent No.: US 7,712,143 B2
(45) Date of Patent: May 4, 2010

(54) TRUSTED ENCLAVE FOR A COMPUTER SYSTEM

(75) Inventor: Fatih Comlekoglu, Great Falls, VA (US)

(73) Assignee: Blue Ridge Networks, Inc., Chantilly, VA (US)

( * ) Notice: Subject to any disclaimer, the term of this patent is extended or adjusted under 35 U.S.C. 154(b) by 889 days.

(21) Appl. No.: 11/528,048

(22) Filed: Sep. 27, 2006

(65) Prior Publication Data

US 2008/0077994 A1     Mar. 27, 2008

(51) Int. Cl.
*H04L 9/00* (2006.01)
(52) U.S. Cl. .............................. 726/26; 726/27; 713/181
(58) Field of Classification Search ............. 726/22–27, 726/30, 34; 710/54; 705/51; 713/168, 170, 713/181, 189–194
See application file for complete search history.

(56) References Cited

U.S. PATENT DOCUMENTS

| | | | |
|---|---|---|---|
| 5,276,735 A | 1/1994 | Boebert et al. .............. 713/167 |
| 6,826,684 B1 | 11/2004 | Fink et al. .................... 713/160 |
| 7,043,633 B1 | 5/2006 | Fink et al. .................... 713/162 |
| 7,133,845 B1 * | 11/2006 | Ginter et al. ................... 705/51 |
| 2003/0126468 A1 * | 7/2003 | Markham .................... 713/201 |
| 2004/0111639 A1 * | 6/2004 | Schwartz et al. ............ 713/201 |
| 2006/0031672 A1 | 2/2006 | Soltis et al. ................. 713/164 |
| 2006/0101399 A1 | 5/2006 | Murayama et al. .......... 717/120 |
| 2007/0204078 A1 * | 8/2007 | Boccon-Gibod et al. ...... 710/54 |

FOREIGN PATENT DOCUMENTS

| | | |
|---|---|---|
| JP | 2005129066 | 3/2005 |
| JP | 2006048687 | 2/2006 |

* cited by examiner

*Primary Examiner*—Hosuk Song
(74) *Attorney, Agent, or Firm*—Scot A. Reader

(57) ABSTRACT

A trusted enclave for a software system of a computer node provides relatively high assurance protection of a section of the software system. The trusted enclave attempts to stop malware from compromising parts of the software system within the trusted enclave. If a software system process outside the trusted enclave becomes compromised, the compromised process may be prevented from compromising software system resources within the trusted enclave. Compromise of a process or resource of the software system refers to, for example, malware access, alteration or control of the process or resource.

20 Claims, 5 Drawing Sheets

TRUSTED ENCLAVE FOR A COMPUTER SYSTEM

BACKGROUND OF THE INVENTION

The present invention relates to computer security, and more particularly to a non-holistic but high assurance security system for a computer node.

Complex software systems, such as operating systems, that run on computer nodes often have undetected flaws that can be exploited by malicious computer programs that are received over the Internet or other communication network. Such malicious computer programs, sometimes called malware, include Trojans, viruses, worms, spyware and the like. Most existing security systems for computer nodes attempt to combat malware holistically by trying to prevent it from compromising any part of the software system. Common holistic security systems employed alone or in combination include anti-virus detection and removal systems, system behavior analysis systems and packet inspection systems.

While these holistic security systems can significantly improve computer node security, they cannot guarantee that a software system will be uncompromised by malware. Anti-virus systems are reactive and require detection of a malicious code signature. Such systems typically cannot detect malicious code having an unknown signature and in some cases cannot even remove malicious code that is detected. Behavior analysis systems often cannot distinguish malicious code behavior from legitimate code behavior. Such systems thus routinely fail to stop certain malicious behavior and generate false positives. False positives can result in ineffective protection since after a while users of the computer node ignore constant warning messages. Packet inspection systems designed to detect malicious code within incoming traffic are proactive but suffer from limitations similar to anti-virus systems in terms of inability to detect malicious code having an unknown signature. Finally, packet inspection systems designed to block malicious addresses and protocols (e.g. firewalls) suffer from limitations similar to behavior analysis systems in terms of failure to identify certain malicious activities and generation of false positives. Generally speaking, the holistic security systems described inevitably fail to stop certain malware attacks due to practical limitations. The result is that no computer node connected to the Internet or other communication network is completely invulnerable to malware.

SUMMARY OF THE INVENTION

The present invention, in a basic feature, provides a trusted enclave for a software system of a computer node. Unlike holistic security systems that provide relatively low assurance protection of the entire software system, the trusted enclave provides relatively high assurance protection of a section of the software system. The trusted enclave does not attempt to stop malware from compromising parts of the software system outside the trusted enclave; however, the trusted enclave does attempt to stop malware from compromising parts of the software system within the trusted enclave. Accordingly, if a software system process outside the trusted enclave becomes compromised, the compromised process may be prevented from compromising software system resources within the trusted enclave. Compromise of a process or resource of the software system refers to, for example, malware access, alteration or control of the process or resource.

In one aspect of the invention, a computer node comprises a software system resource within a trusted enclave and a software system process outside the trusted enclave, wherein access of the process to the resource is conditioned at least in part on a policy operative within the trusted enclave.

In some embodiments, the access is conditioned on one or more of whether the process is qualified as a trusted process, conformance of the process with an access control rule within a policy schema operative within the trusted enclave, an authentication process external to the trusted enclave and a type of access attempted by the process.

In some embodiments, information respecting a denial of access to the process is logged within the trusted enclave.

In some embodiments, the logged information is cryptographically signed by a hardware system element within the trusted enclave.

In some embodiments, the logged information is transmitted to a centralized log facility.

In another aspect of the invention, a trusted enclave for a computer node comprises a software agent and a hardware element communicatively coupled with the software agent, wherein the software agent invokes the hardware element to cryptographically sign information generated within the trusted enclave.

In some embodiments, the signed information comprises one or more of: a hash value of at least one of the software agent, a policy schema within the trusted enclave and an interceptor within the trusted enclave; a hash value of logged information respecting at least one of an actual or attempted breach of integrity of the trusted enclave; and a hash value of at least one resource within the trusted enclave.

In some embodiments, the information is signed using a private key of the hardware element.

In some embodiments, RSA-1024 is invoked as the encryption algorithm.

In some embodiments, the trusted enclave further comprises an interceptor, a policy schema and a resource, wherein the software agent receives from the interceptor information respecting an activity of a process outside the trusted enclave and conditions at least one of access and authorization of the process to the resource based at least in part on a conformance of the activity with a policy within the policy schema.

In another aspect, a method for conditioning access to a trusted enclave on a computer node, wherein the computer node comprises at least one software system resource within the trusted enclave and at least one software system process outside the trusted enclave, comprises determining based at least in part on a policy operative within the trusted enclave whether to commission the software system process as a trusted process in response to a launch of the software system process and determining based at least in part on whether the software system process is commissioned as a trusted process whether to allow the software system process access to the software system resource in response to an attempt by the software system process to access the software system resource.

In some embodiments, the method further comprises determining based at least in part on a policy operative within the trusted enclave whether to decommission the software system process as a trusted process in response to a suspicious activity of the software system process.

In some embodiments, the method further comprises determining based at least in part on a policy operative within the trusted enclave whether to commission a second process as a trusted process in response to a creation of the second process by the software system process.

These and other features of the present invention will be better understood by reference to the detailed description of the preferred embodiment read in conjunction with the draw-

DETAILED DESCRIPTION OF A PREFERRED EMBODIMENT

Figure 1:
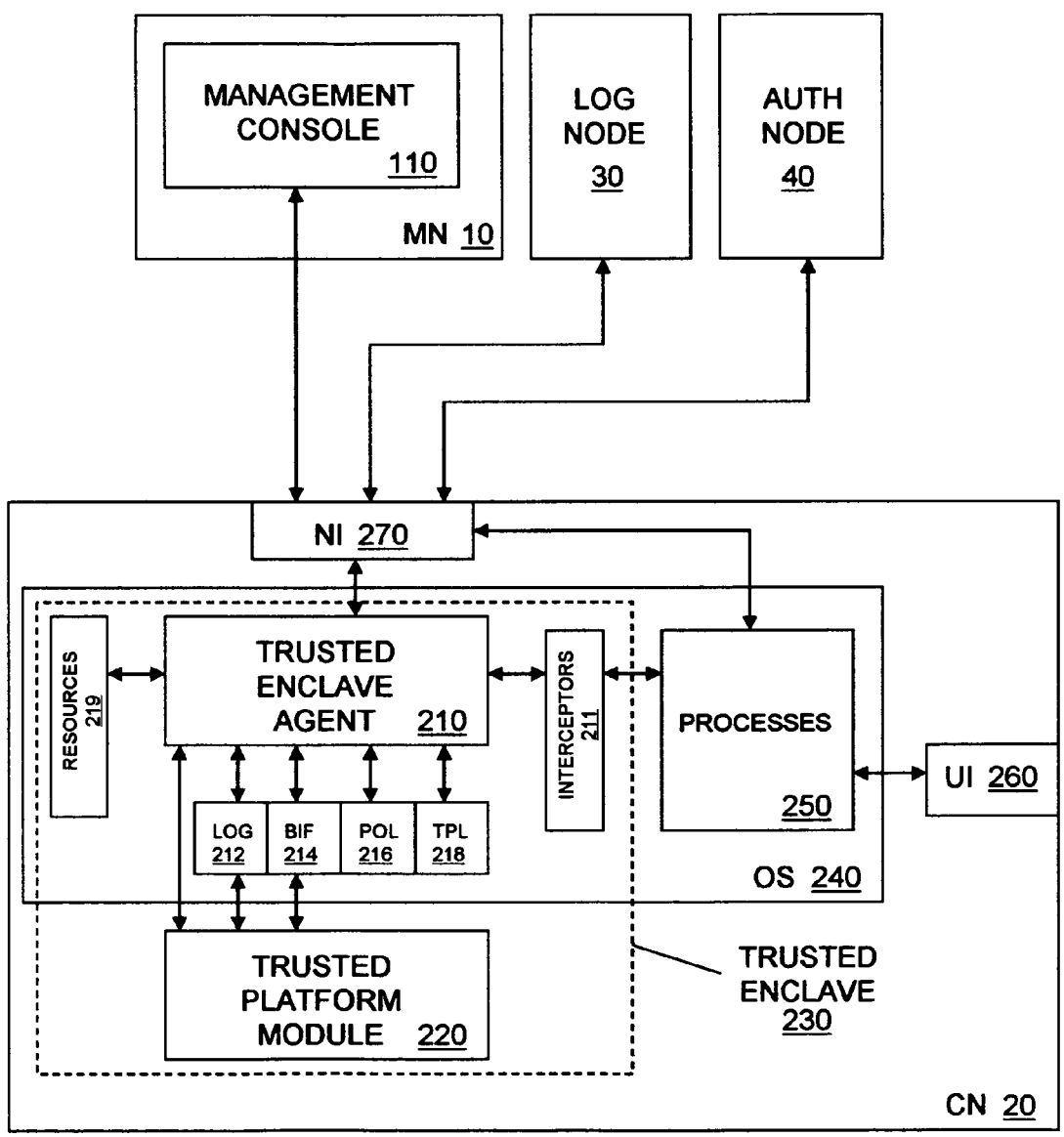
FIG. 1 shows a computer network including a computer node having a trusted enclave in one embodiment of the invention.

In FIG. 1, a computer network including computer node 20 having a trusted enclave 230 is shown in one embodiment of the invention. In the illustrated embodiment, computer node 20 is a personal computer, although in other embodiments a computer node having a trusted enclave may be a personal data assistant, an Internet Protocol (IP) or cellular phone, a server computer, a router or a switch, for example. In the illustrated embodiment, computer node 20 is communicatively coupled via network interface 270 with other computer nodes, including a management node 10, a log consolidation node 30 and an authentication node 40 although in other embodiments a comparable authentication service may be co-located on computer node 20. Moreover, in other embodiments two or more of the management services provided by management node 10, the log consolidation services provided by log consolidation node 30 and the authentication services provided by authentication node 40 may be co-located on a single network node. Communication between nodes 10, 30, 40, on the one hand, and node 20, on the other, may be achieved using various data communication protocols, such as TCP/IP, and may be conducted via zero or more intermediate network nodes, such as routers and switches.

Management node 10 has a management console 110 thereon. Management console 110 is a software system adapted to communicate securely with a trusted enclave agent 210 on computer node 20 as will be explained in more detail.

Computer node 20 includes an operating system 240 communicatively coupled between a user interface 260 and network interface 270. Operating system 240 is a software system that executes and manages software elements as well as networking and user interfacing for computer node 20. Operating system 240 executes and manages software elements within and outside trusted enclave 230 as well as interactions between such elements. Software elements executed and managed by operating system 240 are depicted in FIG. 1 as part of operating system 240 for the sake of clarity, although it will be appreciated that some of these elements may be merely executed and managed by operating system 240. In some embodiments, operating system 240 is a Microsoft Windows-based operating system, such as Windows 2000, Windows XP or Windows Vista, and runs on an Intel-based general purpose microprocessor such as Intel Pentium II, Pentium III, Pentium 4 or Celeron.

Trusted enclave 230 includes a logical group of software elements executed and managed by operating system 240 as well as at least one hardware element. The software elements within trusted enclave 230 include protective elements that provide high assurance protection and protected resources 219 that receive high assurance protection from the protective elements. The protective elements include trusted enclave agent 210, interceptors 211, log file 212, binding information file 214, policy schema 216 and trusted process list 218. The hardware elements within trusted enclave 230 include trusted platform module (TPM) 220.

Protected resources 219 are identified in policy schema 216. Protected resources 219 may include, for example, file system sections, such as file system folders, application specific files distinguishable via file extensions and particular files; operating system state database sections, such as sections of system registry files, sections of network configuration files; operating system initiated processes which need to be protected from involuntary termination and suspension; and dynamically loadable application components, such as dynamically linkable libraries (DLL) in Windows environments or shared libraries in UNIX and Linux environments.

TPM 220 is a microcontroller within trusted enclave 230 that interfaces with trusted enclave agent 210 but is neither managed nor executed by operating system 240. TPM 220 uses a TPM private key to facilitate high assurance protection of protected resources 219 and high assurance detection of actual and attempted breaches of the integrity of trusted enclave 230. In some embodiments, TPM 220 is an application specific integrated circuit (ASIC) compliant with Trusted Computing Group Trusted Platform Module Specification Version 1.2 and installed on computer node 20 by the manufacturer of computer node 20. It will be appreciated that hardware-based management and execution of TPM 220 limits the vulnerability of TPM 220 to malware attacks and improves overall security of trusted enclave 230.

The software elements outside trusted enclave 230 include processes 250. Processes 250 include, for example, applications that run on operating system 240 and that are not within trusted enclave 230.

Secure operation of trusted enclave 230 is dependent upon secure installation of the trusted enclave software package. Management console 110, under direction of an administrator, prepares the trusted enclave software package for secure installation. In some embodiments, the trusted enclave software package includes agent 210, interceptors 211 and policy schema 216. Management console 110 maintains a master copy of agent 210 and interceptors 211. Additionally, the administrator uses management console 110 to generate a policy schema 216 appropriate for computer node 20. Management console 110 generates a hash value of agent 210 and interceptors 211 and cryptographically signs the agent/interceptor hash value using the management console private key. Management console 110 also generates a hash value of policy schema 216 and cryptographically signs the schema hash value using the management console private key. Management console 110 further generates a hash value of the entire software package and cryptographically signs the package hash value using the management console private key. In some embodiments, policy schema 216 is also cryptographically signed by the administrator who defined the policy schema 216 using the administrator private key. Once all of the signatures have been applied, management console 110 downloads the signed software package to computer node 20. It will be appreciated that the signed hash values may be used to detect any alteration or corruption of the trusted enclave software package or elements thereof prior to installation on computer node 20, whether by malware or otherwise.

Figure 2:
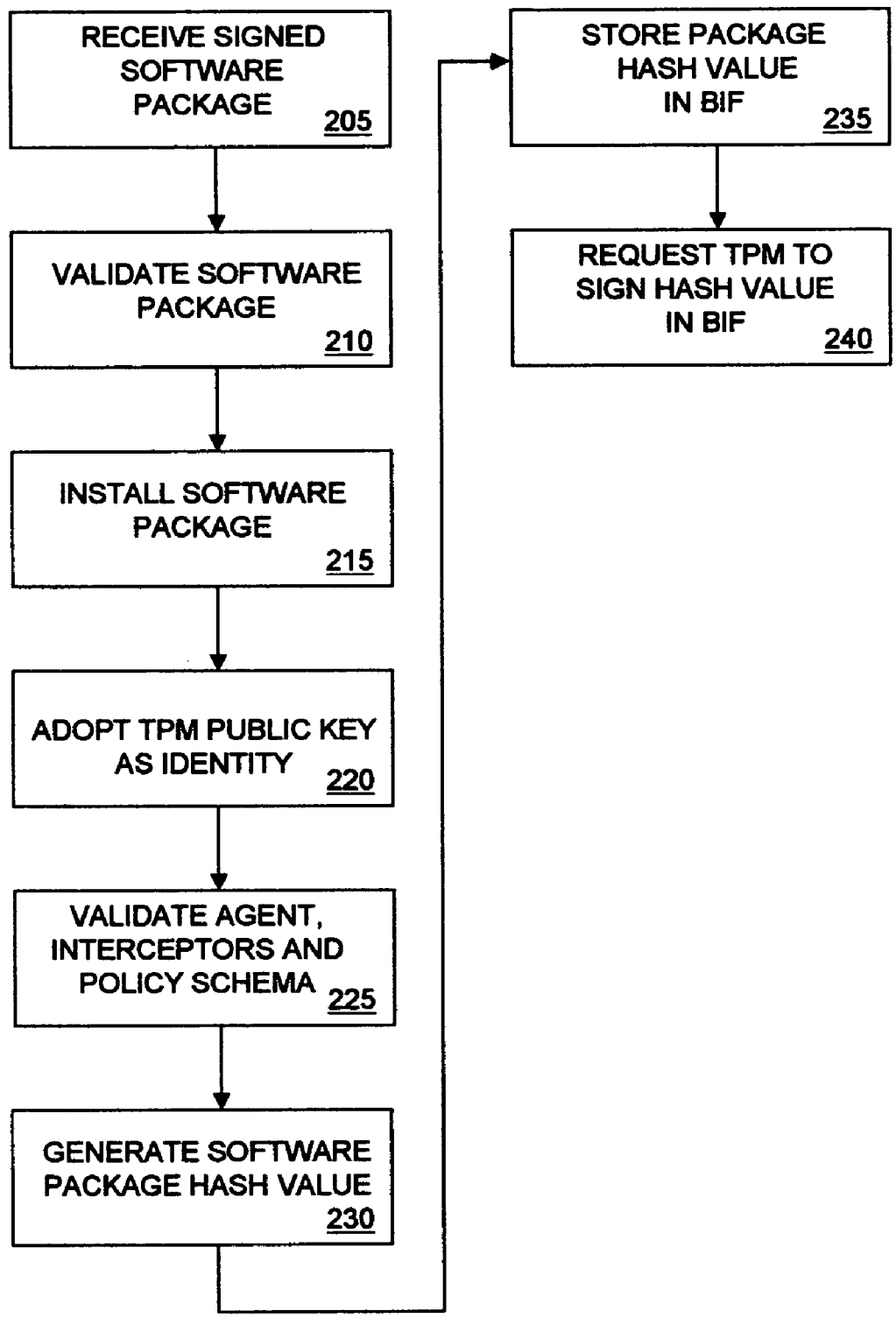
FIG. 2 is a flow diagram illustrating a secure method for installing a trusted enclave software package on a computer node in one embodiment of the invention.

Turning to FIG. 2, a secure method for installing the downloaded trusted enclave software package on computer node 20 is shown in one embodiment of the invention. Operating system 240 receives the signed software package (205) and validates the entire software package using the public key of the management console 110 (210). If validation is successful, operating system 240 completes installation of the software package (215) and the installed agent 210 retrieves and adopts the TPM public key as the identity of agent 210 (220). Agent 210 then validates the agent 210, interceptor 211 and policy schema 216 using the public key of management console 110 (225). If all of the validations are successful, agent 210 is installed as an unstoppable element of operating system 240. If any of the validations is unsuccessful, agent 210 self-terminates.

Once installed as an unstoppable element of operating system 240, agent 210 generates a new hash value of the entire software package (230). Agent 210 stores the new hash value in binding information file 214 (235) and requests TPM 220 to cryptographically sign the new hash value using the TPM private key (240). TPM 220 signs the new hash value as requested. It will be appreciated that the TPM-signed new hash value may be used to detect any subsequent alteration or corruption of agent 210, interceptors 211 or policy schema 216, whether by malware or otherwise.

As circumstances warrant, it may be desirable to replace installed policy schema 216 with a new policy schema. In that event, an administrator uses management console 110 to generate a new policy schema appropriate for computer node 20. Management console 110 generates a hash value of the new policy schema and cryptographically signs the schema hash value using the management console private key. In some embodiments, the new policy schema is also cryptographically signed by the administrator who defined the new policy schema using the administrator private key. Once all of the signatures have been applied, management console 110 downloads the new policy schema to computer node 20.

Figure 3:
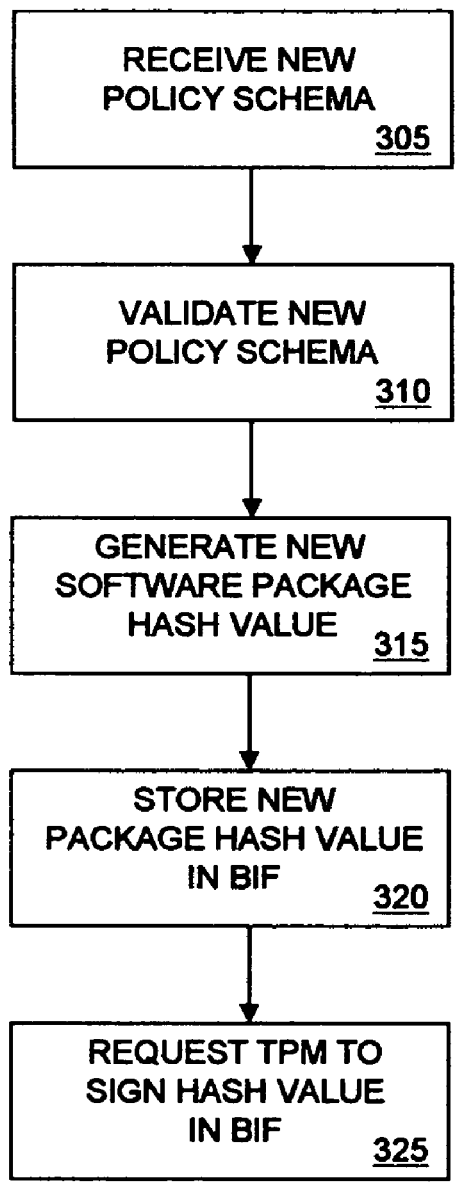
FIG. 3 is a flow diagram illustrating a secure method for installing a new policy schema on a computer node in one embodiment of the invention.

Turning now to FIG. 3, a flow diagram illustrates a secure method for installing a new policy schema on computer node 20 in one embodiment of the invention. Agent 210 receives the signed new policy schema (305) and validates the new policy schema source using the public key of the management console 110 (310). If validation is successful, agent 210 completes installation of the new policy schema and generates a new hash value of the entire software package, for example, agent 210, interceptors 211 and the new policy schema (315). Agent 210 stores the new hash value in binding information file 214 (320) and requests TPM 220 to cryptographically sign the new hash value using the TPM private key (325). TPM 220 signs the new hash value as requested.

As circumstances warrant, it may be desirable to uninstall the installed trusted enclave software package. In that event, management console 110, under direction of the administrator, prepares a trusted enclave uninstall software package. Management console 110 maintains a master copy of the uninstall software package. Management console 110 generates a hash value of the uninstall software package and cryptographically signs the hash value using the management console private key. In some embodiments, the uninstall software package is also cryptographically signed by the administrator using the administrator private key. Once all of the signatures have been applied, management console 110 downloads the signed uninstall software package to computer node 20.

Figure 4:
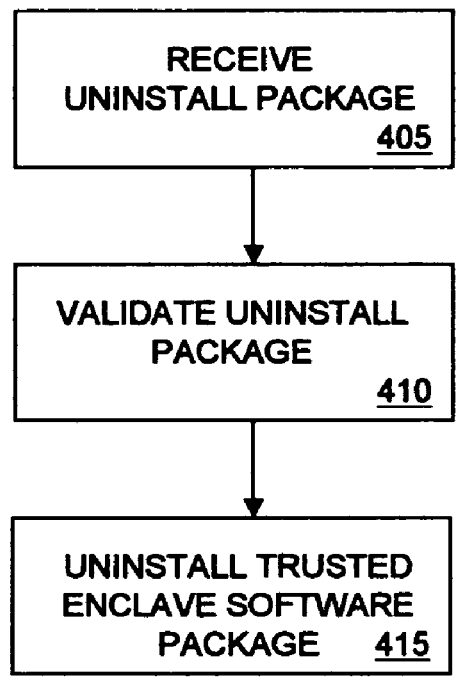
FIG. 4 is a flow diagram illustrating a secure method for uninstalling a trusted enclave software package on a computer node in one embodiment of the invention.

Turning now to FIG. 4, a flow diagram illustrates a secure method for deinstallation of a trusted enclave software package on computer node 20 in one embodiment of the invention. Agent 210 receives the signed uninstall software package (405) and validates the uninstall software package using the public key of the management console 110 (410). If validation is successful, agent 210 permits deinstallation of the trusted enclave software package including, for example, agent 210, interceptors 211 and policy schema 216 (415). Any protective elements spawned by agent 210 during installation or operation, such as log file 212, binding information file 214 and trusted process list 218, may also be uninstalled. In some embodiments, trusted enclave software package and protective elements are removed from computer node 20 attendant to deinstallation. No action other than receipt of a valid uninstall software package will prompt agent 210 to permit deinstallation.

During its tenure as an unstoppable element of operating system 240, trusted enclave agent 210 performs two primary roles: (1) providing high assurance protection of protected resources 219 and (2) providing high assurance detection of actual and attempted breaches of the integrity of trusted enclave 230. To perform these roles, trusted enclave agent 210 cooperatively interfaces with other protective elements within trusted enclave 230, including interceptors 211, binding information file 214, policy schema 216, trusted process list 218 and TPM 220, and also interfaces with log consolidation node 30 and authentication node 40.

One way in which trusted enclave agent 210 fulfills its first primary role is by conditioning access of processes 250 to protected resources 219 based on policies defined in policy schema 216. To properly condition access, agent 210 maintains trusted process list 218 identifying which processes are qualified as trusted.

Figure 5:
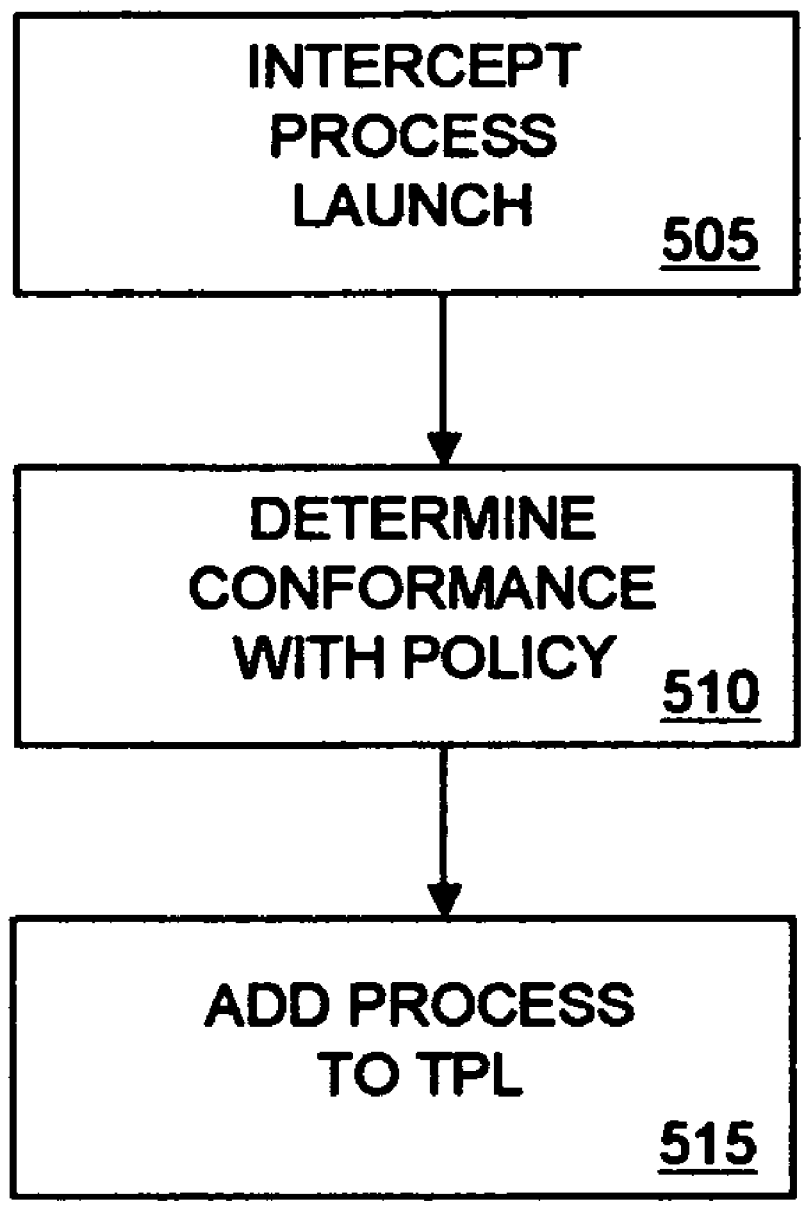
FIG. 5 is a flow diagram illustrating a secure method for adding a process to a trusted process list within a trusted enclave.

Turning now to FIG. 5, a flow diagram illustrates a secure method for adding a process to trusted process list 218 in one embodiment of the invention. When a process within processes 250 is loaded by operating system 240 in preparation for execution, a process launch interceptor, which is one of interceptors 211, intercepts the load operation (505) and notifies agent 210 of the impending launch. The notification includes a process ID assigned to the process by operating system 240 and the complete file or directory path to the process. Agent 210 determines whether the process or path elements meet a trustable process definition within policy schema 216 (510) and, if so, agent 210 adds the process ID to trusted process list 218 (515). For example, in one embodiment, a trustable process definition within policy schema 216 includes hash values of trusted applications cryptographically signed by management console 110 using the management console private key. Agent 210 uses the trustable process definition and the management console public key to determine whether the application awaiting launch is a trusted application or not. If the application is a trusted application, agent 210 adds the application ID to trusted process list 218. Naturally, if the process or the path does not meet the trustable process definition in policy schema 216, agent 210 declines to add the application ID to trusted process list 218. Moreover, in some embodiments, agent 210 may in that event instruct the process launch interceptor to block the process from running on operating system 240. During its tenure as a trusted process, a process within processes 250 receives privileges of access to protected resources 219 that are afforded only to processes within trusted process list 218.

Figure 6:
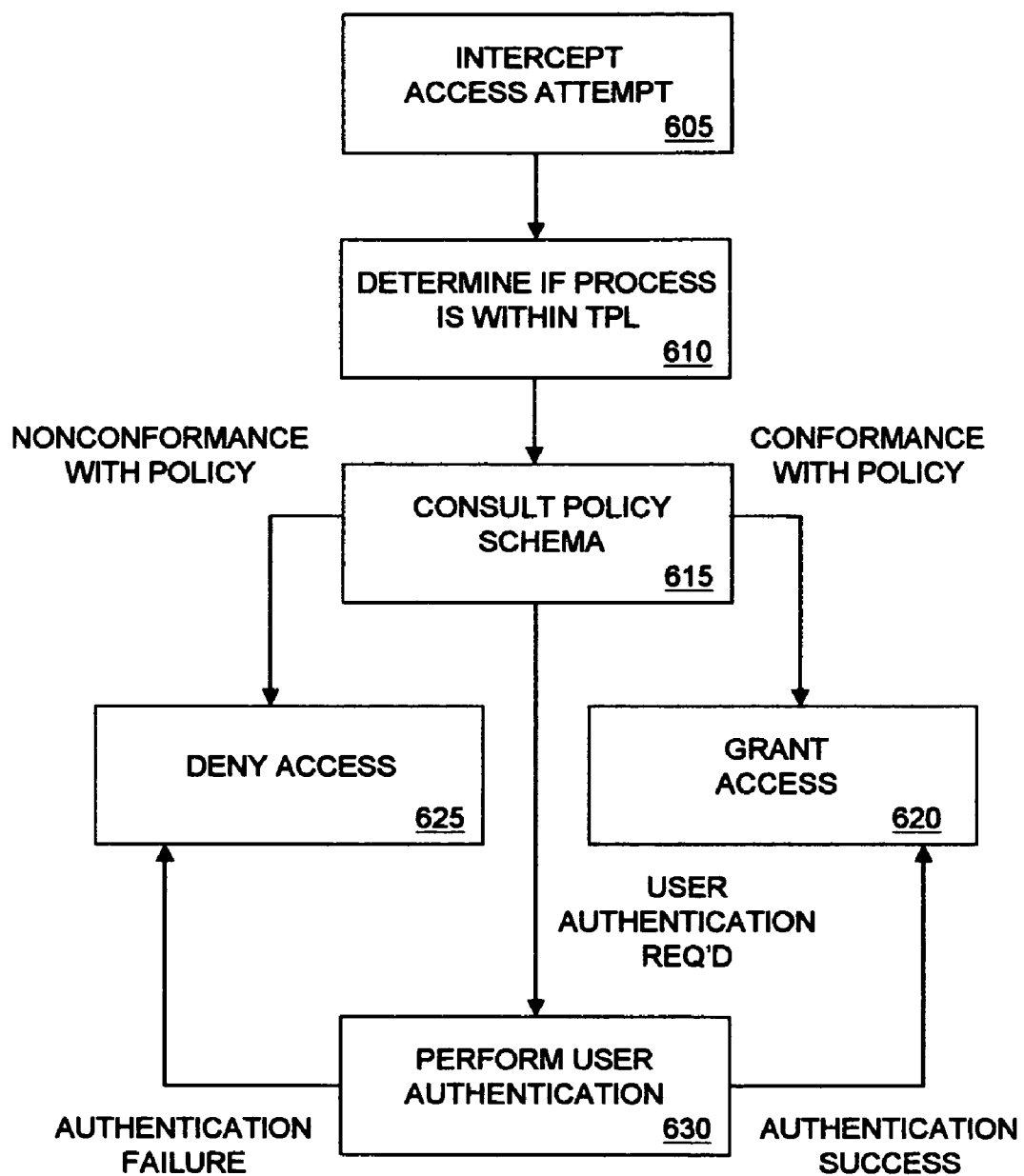
FIG. 6 is a flow diagram illustrating a secure method for controlling access to a resource within a trusted enclave.

Turning now to FIG. 6, a flow diagram illustrates a secure method for controlling access to protected resources 219 in one embodiment of the invention. When a process within processes 250 attempts access to a resource within protected resources 219, a process access interceptor, which is one of interceptors 211, intercepts the access operation (605) and notifies agent 210 of the access attempt. The notification includes a process ID assigned to the process by operating system 240, the complete file or directory path to the process and the type of access. Agent 210 determines whether the process ID is within trusted process list 218 (610). Agent 210 then consults policy schema 216 to determine whether the access attempt is conformant or not with policy (615). If the access attempt conforms to policy, agent 210 instructs the access interceptor to allow the process to access the protected resource (620). If the access attempt does not conform to policy, agent 210 instructs the access interceptor to block the process from accessing the protected resource (625). If policy indicates that user authentication is required, agent 210 instructs the access interceptor to temporarily block the process from accessing the protected resource pending the outcome of a user authentication process (630). Naturally, if unsuccessful authentication is reported, agent 210 instructs the access interceptor to block the process from accessing the protected resource (625).

In some embodiments, an access attempt conforms to policy if an operative access control rule indicates to permit access and does not conform to policy if an operative access control rule indicates to deny access. In these embodiments, policy schema 216 includes one or more access control rules in the form <condition, action > and a hierarchy of rules application. A condition specifies one or more process identity elements (e.g. all trusted processes, particular process ID, particular file or directory path element) and a type of access being attempted (e.g. read, write). An action specifies a course of action for a process meeting a condition (e.g. permit access, deny access, require user authentication). If more than one condition is met, a rules hierarchy is invoked to determine which action is applied. If no condition is met, a default rule is applied. If the determined course of action is to permit access, agent 210 instructs the access interceptor to allow the process to access the protected resource. If the determined course of action is to deny access, agent 210 instructs the access interceptor to block the process from accessing the protected resource. If the determined course of action is to require user authentication, agent 210 instructs the access interceptor to temporarily block the process from accessing the protected resource pending the outcome of a user authentication process. Agent 210 may, for example, invoke authentication node 40 to undertake an authentication process in which a user is challenged to submit credentials via user interface 260, the credentials are verified on authentication node 40 and successful authentication is reported to agent 210 prior to instructing the access interceptor to allow the process to access the protected resource.

In some embodiments of the invention, trusted process status may be revoked upon detecting networking or other suspicious activity involving the trusted process. For example, when a process within processes 250 engages in a suspicious activity, a suspicious activity interceptor, which is one of interceptors 211, intercepts the suspect operation and notifies agent 210. The notification includes a process ID assigned by operating system 240 to the process engaging in the suspicious activity, the complete file or directory path to the process and the type of activity. Agent 210 determines whether the process ID is within trusted process list 218. If the process ID is within trusted process list 218, agent 210 consults trusted process rejection rules within policy schema 216 to determine a course of action. Each rule specifies as a condition one or more process identity elements (e.g. all trusted processes, particular process ID, particular file or directory path element) and a type of activity (e.g. outbound connection, inbound connection, use of TCP port 80, use of UDP port 500, spawning of a command shell, launching of an application). If the intercepted activity meets a condition, agent 210 removes the process from trusted process list 218. Naturally, if the process is not a trusted process, the check of policy schema 216 is obviated.

In some embodiments of the invention, trusted process status may be inherited. For example, when a parent process within processes 250 spawns a child process, a process creation interceptor, which is one of interceptors 211, intercepts the process creation event and notifies agent 210. The notification includes process IDs assigned to the parent and child processes by operating system 240 and the complete file or directory paths to the parent and child processes. Agent 210 determines whether the parent process ID is within trusted process list 218. If the parent process ID is within trusted process list 218, agent 210 consults trusted process inheritance rules within policy schema 216 to determine a course of action. Each rule specifies as a condition one or more process identity elements (e.g. all trusted processes, particular parent process ID, particular parent file or directory path element, particular child process ID, particular child file or directory path element). If the intercepted process creation event meets a condition, agent 210 adds the child process to trusted process list 218. Naturally, if the process is not a trusted process, or if no condition is met, agent 210 declines to add the child process to trusted process list.

Two ways in which trusted enclave agent 210 fulfills its second primary role are by (1) logging validation failures and other unauthorized and suspicious events and (2) regularly verifying the integrity of trusted enclave 230.

With regard to logging of failures and unauthorized and suspicious events, whenever agent 210 is unable to validate any signature during installation or operation, or determines that an attempt to access a protected resource is not authorized, or determines that an activity is suspicious, agent 210 logs information respecting the validation failure, unauthorized access attempt or suspicious activity in log file 212. Agent 210 then generates a new hash value of log file 212 and requests TPM 220 to cryptographically sign the new hash value using the TPM private key, after which TPM 220 signs the new hash value as requested. It will be appreciated that the TPM-signed hash value may be used to detect any subsequent alteration or corruption of log file 212, whether by malware or otherwise.

With regard to regularly verifying the integrity of trusted enclave 230, agent 210 invokes TPM 220 to sign the software package hash value stored in binding information file 214 in response to trusted enclave software package installation and policy schema updates. In some embodiments, agent 210 thereafter periodically checks the signed software package hash value stored in binding information file 214 using the TPM public key to verify the integrity of the trusted enclave software package installed on computer node 20. Moreover, in some embodiments, the contents of log file 212 and binding information file 214 are periodically uploaded to log consolidation node 30 for auditing. Agent 210 retrieves the log information and the signed hash value stored in log file 212, and the signed software package hash value stored in binding information file 214, appends the TPM public key that agent 210 has adopted as its identity and uploads the log package and software package hash value to log consolidation node 30. Log consolidation node 30 validates the log package and the software package hash value using the TPM public key.

In some embodiments, the contents of log file 212 and binding information file 214 are extracted by log consolidation facility 30 without intervention of agent 210 under certain circumstances, such as when agent 210 has been rendered inoperative due to alteration, corruption or deinstallation. Moreover, in some embodiments, the contents of binding information file 214 are periodically uploaded to management node 10 instead of log consolidation node 30 for auditing.

In some embodiments, policy schema 216 includes integrity detection rules specifying ones of protected resources 219 for high assurance detection of alteration or corruption. In those embodiments, agent 210 instructs TPM 220 to cryptographically sign a hash value of the specified protected resources using TPM private key so that any alteration or corruption of such protected resources can be readily detected. Resource hash values generated based on integrity detection rules may be stored, for example, in binding information file 214 and verified periodically by agent 210.

In some embodiments, Secure Hashing Algorithm (SHA-1) is invoked as the hash algorithm in the generation and validation of hash values described herein whereas RSA-1024 with PKCS#1.5 padding is invoked as the encryption algorithm in the generation and validation of signatures described herein.

In some embodiments, validation is performed as follows. A signed hash value of a software element, schema or file is decrypted using the public key of the source of the signature to regenerate a plain text hash value. A hash value is separately generated from the software element, schema or file. If the regenerated hash value matches the generated hash value then the software element, schema or file is considered validated. Otherwise, validation is considered to have failed.

In some embodiments, downloads and uploads described herein are accomplished using one of email, network file transfer or direct network connectivity. In some embodiments, policy schema 216 is represented in signed eXtensible Markup Language (XML).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A computer node, comprising:
a network interface;
a processor communicatively coupled with the network interface and having an operating system executing thereon; and
a protective hardware element communicatively coupled with the processor, wherein the protective hardware element is not managed by the operating system, and wherein the computer node receives one or more protective software elements via the network interface and installs the protective software elements on the computer node under management of the operating system, and wherein the computer node executes the protective software elements under management of the operating system whereby access of processes to one or more protected resources on the computer node is regulated, suspicious events occurring on the computer node are logged in a log file maintained on the computer node and integrity of the protective software elements and the log file are verified at least in part by validating one or more hash values of the protective software elements cryptographically signed by the protective hardware element and validating a hash value of the log file cryptographically signed by the protective hardware element.

2. The computer node of claim 1, wherein upon updating the log file a hash value of the updated log file is cryptographically signed by the protective hardware element.

3. The computer node of claim 1, wherein upon updating a protective software element a hash value of the updated protective software element is cryptographically signed by the protective hardware element.

4. The computer node of claim 1, wherein access of processes to protected resources on the computer node is regulated at least in part by determining whether a resource to which a process is attempting access is identified as a protected resource in a policy schema maintained on the computer node.

5. The computer node of claim 1, wherein access of processes to protected resources on the computer node is regulated at least in part by determining whether a process attempting access to a protected resource is identified in a trusted process list maintained on the computer node.

6. The computer node of claim 1, wherein access of processes to protected resources on the computer node is regulated at least in part by determining whether a process attempting access to a protected resource meets a trustable process definition in a policy schema maintained on the computer node.

7. The computer node of claim 1, wherein access of processes to protected resources on the computer node is regulated at least in part by determining whether a process attempting access to a protected resource conforms to an access control rule in a policy schema maintained on the computer node.

8. The computer node of claim 7, wherein the access control rule specifies a process type and access type that are subject to the rule and a disposition indication for access attempts conforming to the process type and access type.

9. The computer node of claim 8, wherein the disposition indication is selected from among unconditionally permitting access, unconditionally denying access or requiring authentication and permitting access only if authentication is successful.

10. The computer node of claim 9, wherein a plurality of access control rules is applied hierarchically to determine a disposition.

11. The computer node of claim 1, wherein access of processes to protected resources on the computer node is regulated at least in part by revoking trusted status of a process in response to determining that the process conforms to a trusted process rejection rule in a policy schema maintained on the computer node.

12. The computer node of claim 11, wherein the trusted process rejection rule specifies a process type and suspicious activity type that are subject to the rule.

13. The computer node of claim 1, wherein access of processes to protected resources on the computer node is regulated at least in part by granting trusted status to a child process spawned by a trusted parent process in response to determining that the child process conforms to a trusted process inheritance rule in a policy schema maintained on the computer node.

14. The computer node of claim 1, wherein suspicious events occurring on the computer node are logged at least in part by logging an event in the log file upon determining that a hash value of a protective software element is not validated.

15. The computer node of claim 1, wherein suspicious events occurring on the computer node are logged at least in part by logging an event in the log file upon determining that an attempt to access a protected resource is unauthorized.

16. The computer node of claim 1, wherein the computer node executes the protective software elements under management of the operating system whereby integrity of the protected resources is verified at least in part by validating a hash value of a protected resource cryptographically signed by the protective hardware element.

17. The computer node of claim 1, wherein integrity of the protective software elements is verified before and after the protective software elements are installed on the computer node.

18. The computer node of claim 1, wherein the protective software elements installed on the computer node run unstoppably until uninstalled by one or more uninstall software elements received via the network interface.

19. The computer node of claim 18, wherein integrity of the uninstall software elements is verified before the uninstall software elements are allowed to uninstall the protective software elements.

20. A method for maintaining a trusted enclave on a computer node, comprising the steps of:

receiving one or more protective software elements on the computer node;

installing the protective software elements on the computer node under management of an operating system executing on the computer node;

regulating by the computer node access of processes to one or more protected resources on the computer node using the protective software elements under management of the operating system;

logging by the computer node suspicious events occurring on the computer node in a log file maintained on the computer node using the protective software elements under management of the operating system; and verifying integrity of the protective software elements and the log file by the computer node using the protective software elements under management of the operating system at least in part by validating one or more hash values of the protective software elements cryptographically signed by a protective hardware element on the computer node and validating a hash value of the log file cryptographically signed by the protective hardware element, wherein the protective hardware element is not managed by the operating system.

* * * * *